(12) United States Patent
Itadani et al.

(10) Patent No.: US 11,543,033 B2
(45) Date of Patent: Jan. 3, 2023

(54) MECHANICAL SEAL

(71) Applicant: EAGLE INDUSTRY CO., LTD., Tokyo (JP)

(72) Inventors: Masatoshi Itadani, Tokyo (JP); Yuki Sasaki, Tokyo (JP); Keiichi Chiba, Tokyo (JP); Kenji Kiryu, Tokyo (JP); Tetsuzo Okada, Tokyo (JP)

(73) Assignee: EAGLE INDUSTRY CO., LTD.

( * ) Notice: Subject to any disclaimer, the term of this patent is extended or adjusted under 35 U.S.C. 154(b) by 242 days.

(21) Appl. No.: 16/468,649

(22) PCT Filed: Dec. 27, 2017

(86) PCT No.: PCT/JP2017/047144
§ 371 (c)(1),
(2) Date: Jun. 11, 2019

(87) PCT Pub. No.: WO2018/124252
PCT Pub. Date: Jul. 5, 2018

(65) Prior Publication Data
US 2019/0331227 A1    Oct. 31, 2019

(30) Foreign Application Priority Data
Dec. 29, 2016    (JP) .............................. JP2016-257155

(51) Int. Cl.
*F16J 15/36*    (2006.01)
(52) U.S. Cl.
CPC .................................. *F16J 15/363* (2013.01)
(58) Field of Classification Search
CPC .................................. F16J 15/363; F16J 15/36
See application file for complete search history.

(56) References Cited

U.S. PATENT DOCUMENTS 3,117,793 A * 1/1964 Hauser ..................... F16J 15/36
277/372
8,955,848 B2 * 2/2015 Roddis ................... F16J 15/348
277/370
(Continued)

FOREIGN PATENT DOCUMENTS

EP     1357319 A2 * 10/2003    ........... F16J 15/3464
EP     2025976 A1 *  2/2009    ............. F16J 15/348
(Continued)

OTHER PUBLICATIONS

International Search Report (ISR) dated Mar. 20, 2018, issued for International application No. PCT/JP2017/047144. (2 pages).

*Primary Examiner* — Vishal A Patel
(74) *Attorney, Agent, or Firm* — Hayes Soloway P.C.

(57) ABSTRACT

In an exemplary embodiment, a mechanical seal for sealing a fluid flowing outwardly radially from sliding surfaces S where a stationary ring 221 and a rotating ring 211 slide against each other, includes: a bellows 222 interposed between the stationary ring 221 and a stationary wall 226; a case member 223 for holding an outer cylindrical part 222c of the bellows 222 to the stationary ring 221; and a holding member 224 fitted to an inner cylindrical part 222a of the bellows 222, and having an axial length substantially equal to a length fitted to the inner cylindrical part 222a, wherein the bellows 222 has a curved part 222b between the outer cylindrical part 222c and the inner cylindrical part 222a, and the case member 223 is provided with a wall part 223a covering the entire periphery of the radial outer side of the curved part 222b.

2 Claims, 10 Drawing Sheets

(56) References Cited

U.S. PATENT DOCUMENTS

| | | |
|---|---|---|
| 2005/0230923 A1 | 10/2005 | Kametaka et al. |
| 2014/0217676 A1 * | 8/2014 | Hosoe ................... F16J 15/34 |
| | | 277/350 |
| 2015/0115537 A1 * | 4/2015 | Tokunaga ............... F16J 15/34 |
| | | 277/348 |
| 2015/0184752 A1 * | 7/2015 | Itadani ................ F16J 15/3412 |
| | | 277/400 |
| 2015/0226334 A1 * | 8/2015 | Itadani ................ F16J 15/3424 |
| | | 277/400 |
| 2018/0269743 A1 | 9/2018 | Büttner et al. |

FOREIGN PATENT DOCUMENTS

| | | | | |
|---|---|---|---|---|
| FR | 2503311 A1 | * | 10/1982 | ............. D06F 37/00 |
| GB | 663524 A | * | 2/1948 | ........... F16J 15/3456 |
| GB | 1124146 A | | 8/1968 | |
| JP | H01165863 U | | 11/1989 | |
| JP | H0587372 U | | 11/1993 | |
| JP | H07170694 A | | 7/1995 | |
| JP | 2000074226 A | * | 3/2000 | ............ F16J 15/348 |
| JP | 2004225856 A | * | 8/2004 | |
| JP | 2005265075 A | | 9/2005 | |
| WO | 2016050534 A1 | | 4/2016 | |

\* cited by examiner

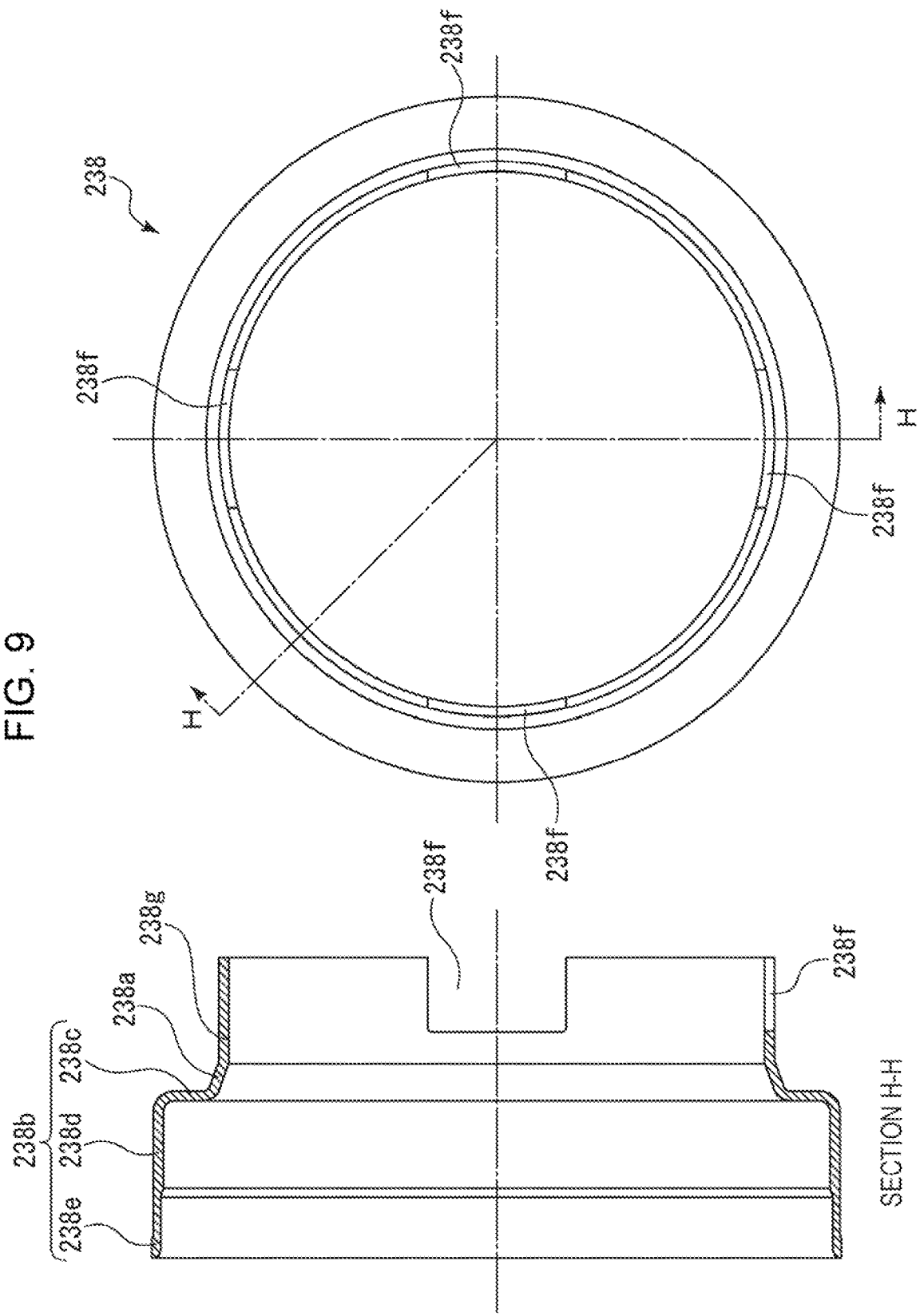

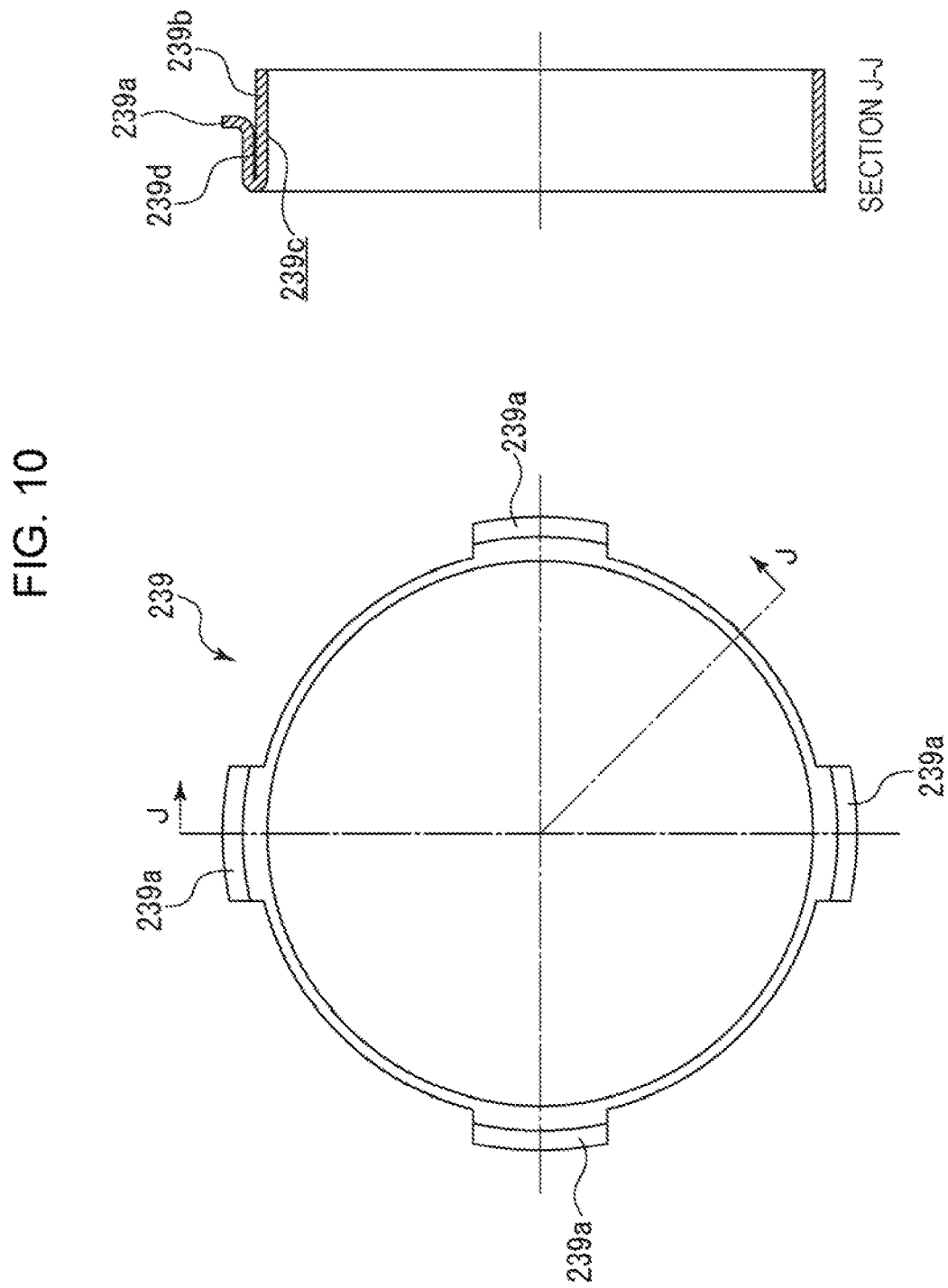

MECHANICAL SEAL

CROSS-REFERENCE TO RELATED APPLICATIONS

This application is the U.S. National Phase under 35 U.S.C. §371 of International Application PCT/JP2017/047144, filed Dec. 27, 2017, which claims priority to Japanese Patent Application No. 2016-257155, filed Dec. 29, 2016. The International Application was published under PCT Article 21(2) in a language other than English.

TECHNICAL FIELD

The present invention relates to a mechanical seal in which the relative position between a rotating ring that is fixed on a rotating-shaft side and a stationary ring that is fixed on a stationary-wall side with a bellows interposed therebetween is greatly displaced due to temperature changes.

BACKGROUND ART

Hitherto, a device that cools a rotor with a liquid in a totally-enclosed-type rotating electrical machine has been known (refer to, for example, Patent Literature 1). In a liquid-cooling-system rotor 4, a cooling liquid supplied to a hole 5a, provided in a hollow shaft 5, from a liquid entering port 6c of a liquid entering pipe 6a, attached to a cooling liquid box 6, is reversed at an end face 5b of the hole, flows backward through a gap 5c between the hole 5a of the hollow shaft and an outer periphery of the liquid entering pipe 6a, flows out of a liquid discharge port 6b, provided in the cooling liquid box 6, from an opening part 5d of the hole, and a rotor 130 is cooled. In addition, a thrust-direction sliding ring 7b and a rotating ring 7c of a mechanical seal unit 7 slide mutually at contact seal surfaces B and prevent leakage of the cooling liquid flowing through the hole 5a of the hollow shaft 5.

Further, as a device that cools a rotor with a liquid in a totally-enclosed-type rotating electrical machine, a device in Patent Literature 2 exists. In Patent Literature 2, by disposing a mating ring 41 of a mechanical seal at an inner peripheral part of a hollow shaft 5 and making this an outside-type mechanical seal that limits leakage of a fluid moving from an inside-diameter side towards an outside-diameter side of sliding faces, the diameters of the sliding faces between the mating ring 41 and a seal ring 42 are reduced and the peripheral speeds at the sliding faces are suppressed, thereby realizing a high-speed and large-capacity liquid-cooling-system rotor.

In Patent Literature 2, the seal ring 42 is fixed in a sealed manner to a carrier 37 with an elastic bellows 44 having a plurality of turn-back parts and made of rubber interposed therebetween, and is urged in an axial direction by a spring 45. In this way, since the elastic bellows 44 is capable of absorbing the relative displacement between the hollow shaft 5 and the carrier 37 by being provided with the plurality of turn-back parts, even if the hollow shaft 5 is greatly stretched or contracted due to temperature changes, the seal ring 42 follows the movement of the mating ring 41 to make it possible to seal a fluid.

CITATION LIST

Patent Literature

PTL 1: Japanese Unexamined Patent Application Publication No. 7-170694 (pages 2 to 3, FIGS. 1 to 2)

PTL 2: International Publication No. 2016/050534 Pamphlet (page 8, FIG. 1, FIG. 4)

SUMMARY OF INVENTION

Technical Problem

However, in Patent Literature 1, since the mechanical seal unit 7 is disposed on an outer peripheral side of the hollow shaft 5, the diameters and the peripheral speeds at the contact seal surfaces B of the thrust-direction sliding ring 7b and the rotating ring 7c are increased. Therefore, the mechanical seal unit 7 is difficult to apply to large devices and high-speed devices.

On the other hand, the mechanical seal of Patent Literature 2 is applicable to large devices and high-speed devices. However, when, with a rotating shaft being stretched and the elastic bellows 44 being contracted in the axial direction due to temperature changes, fluid pressure acts from inside the bellows, the elastic bellows 44 is deformed into the shape of a barrel; and, in the worst case, the elastic bellows 44 contacts the spring 45 and hinders the movement of the spring 45, as a result of which the mechanical seal may not be capable of exhibiting a sufficient sealing performance. On the contrary, in order for the elastic bellows 44 to be restored to its original shape from its deformed state into the shape of a barrel, it is necessary for the rotating shaft to contract and the elastic bellows 44 to stretch in the axial direction and contract inward in a radial direction. However, since fluid pressure acts inside the elastic bellows 44 at all times, the elastic bellows 44 cannot be restored to its original shape from its deformed state into the shape of a barrel. That is, when internal pressure acts on the elastic bellows 44 in a contracted state in the axial direction due to changes in the relative position between the rotating ring and the stationary ring, irreversible deformation in which a large deformation occurs in the radial direction and the original shape cannot be restored occurs.

The present invention has been made in view of such problems, and an object of the present invention is to provide a mechanical seal that, even if a bellows is greatly deformed due to changes in the relative position between a rotating ring that is fixed on a rotating-shaft side and a stationary ring that is fixed on a stationary-wall side with a bellows interposed therebetween and fluid pressure acts upon the bellows in this state, is capable of reliably exhibiting sealing performance by causing the stationary ring to follow the movement of the rotating ring without irreversibly deforming the bellows.

Solution to Problem

To solve the problems above, a mechanical seal of the present invention is a mechanical seal that seals a fluid moving towards an outside-diameter side from an inside-diameter side of sliding faces where a stationary ring and a rotating ring slide against each other, the stationary ring being fixed to a stationary wall with a bellows interposed therebetween, the mechanical seal comprising:
 a case member for holding an outer cylindrical part of the bellows at the stationary ring; and
 a holding member that is fitted to an inner cylindrical part of the bellows and that has an axial-direction length that is substantially equal to a fitting length with respect to the inner cylindrical part,
wherein the bellows has a curved part between the outer cylindrical part and the inner cylindrical part, and wherein the case member is provided with a cylindrical wall part that covers a radial-direction outer side of the curved part over an entire periphery.

According to this feature, even if fluid pressure acts with the bellows greatly deformed due to changes in the relative position between the rotating ring and the stationary ring, since deformation is restricted by the cylindrical wall part that covers the entire periphery of the curved part, it is possible to prevent irreversible deformation of the bellows.

The mechanical seal of the present invention is such that the holding member includes a protruding part that is shorter than the axial-direction length of the holding member and that is disposed on an open-end-part side of the bellows, and
the case member has a groove part that engages with the protruding part.

According to this feature, the groove part of the case member and the protruding part of the holding member engage with each other to guide the movement of the bellows in the axial direction, and torsional deformation of the bellows can be prevented.

The mechanical seal of the present invention is such that the cylindrical wall part of the case member and the holding member have an overlapping portion where the cylindrical wall part of the case member and the holding member overlap over entire peripheries in a peripheral direction.

According to this feature, by the overlapping portion of the cylindrical wall part of the case member and the holding member, projection of the bellows in the radial direction is prevented, and displacement of the case member in the radial direction can be restricted.

The mechanical seal of the present invention is such that an outer gap part that allows the bellows to deform so as to stretch and contract without restraining the bellows is provided between the bellows and the case member.

According to this feature, it is possible to absorb deformation of the bellows inside the outer gap part without the bellows influencing other members.

The mechanical seal of the present invention is such an inner gap part that allows the bellows to deform so as to stretch and contract without restraining the bellows is provided on an inside-diameter side of the bellows.

According to this feature, it is possible to absorb deformation of the bellows inside the inner gap part without the bellows influencing other members.

BRIEF DESCRIPTION OF DRAWINGS

FIG. 9 shows a case member constituting the mechanical seal according to the third embodiment of the present invention.

FIG. 10 shows a drive ring constituting the mechanical seal according to the third embodiment of the present invention.

DESCRIPTION OF EMBODIMENTS

Embodiments of a mechanical seal according to the present invention are illustratively described with reference to FIGS. 1 to 4. However, unless otherwise particularly explicitly stated, as regards, for example, the dimensions, materials, shapes, and relative arrangements of structural components that are described in the embodiments, the scope of the present invention is not intended to be limited only to these.

First Embodiment

Figure 1:
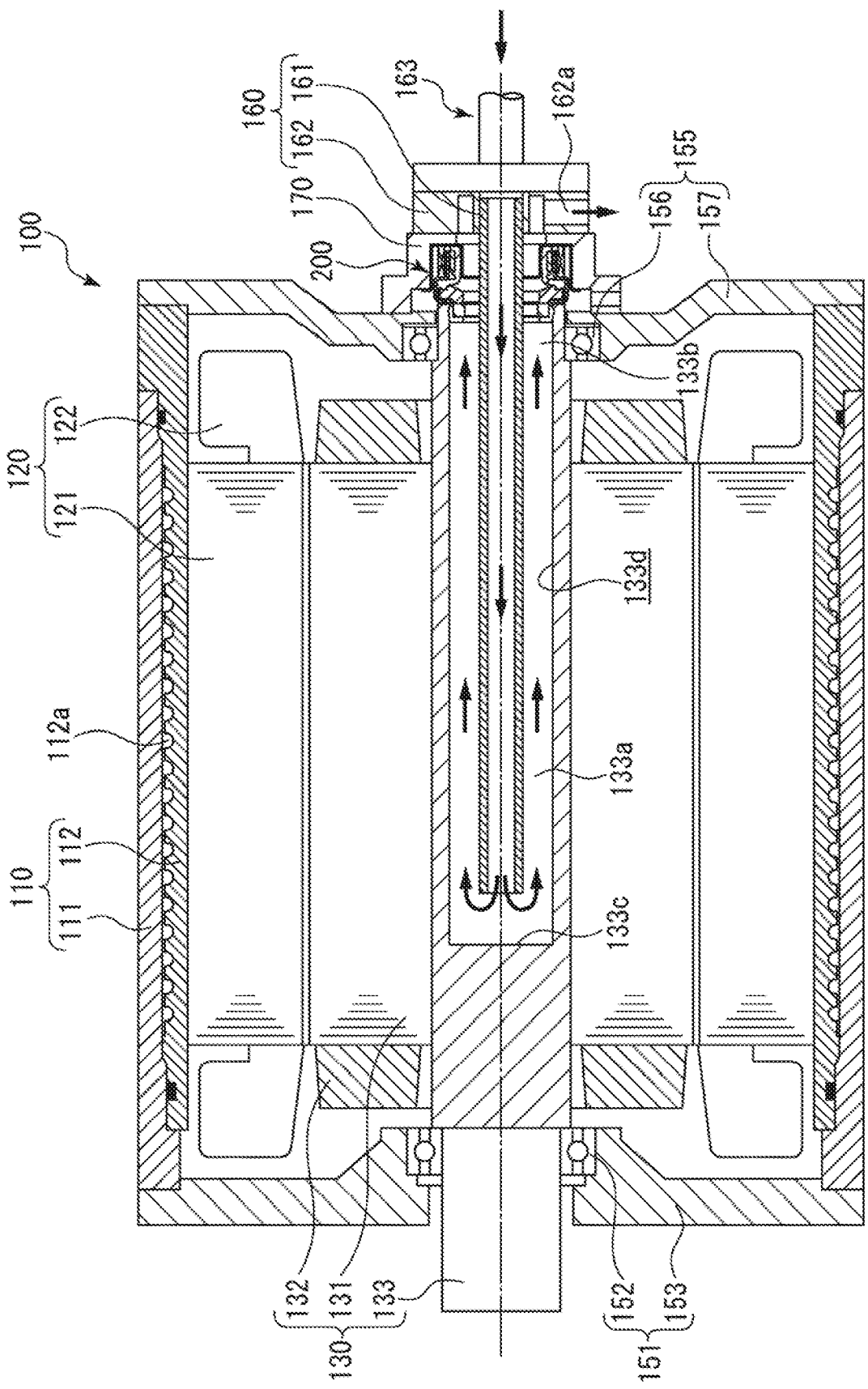
FIG. 1 is a vertical sectional view of a motor to which a mechanical seal according to a first embodiment of the present invention is applied.

In FIG. 1, a motor 100 is a totally-enclosed-type liquid coolant cooling system to which a mechanical seal 200 of the present invention is applied. The motor 100 mainly comprises a stator 120 that is supported inside a stator housing 110, a rotor 130 that is rotatably supported by bearing parts 151 and 155, and the mechanical seal 200. The stator 120 mainly comprises a stator iron core 121 and a stator coil 122, and the rotor 130 mainly comprises a rotor iron core 131, a rotor conductor 132, and a hollow rotating shaft 133. In the motor 100, when electric power is externally supplied to the stator 120 and a rotating magnetic field is produced, the rotor 130 produces a rotational drive force. At the stator 120 and the rotor 130, electrical losses caused by electrification and frictional losses caused by the rotation of the rotor 130 occur. Such losses occurring at the stator 120 and the rotor 130 are such that cooling is performed mainly by a liquid coolant as described below.

The stator housing 110 that supports the stator 120 is mainly composed of a cylindrical outer housing 111 and a cylindrical inner housing 112 having a coolant channel 112*a* formed at an outer periphery thereof. The inner housing 112 is sealed and fitted inside the outer housing 111. The outer housing 111 includes a coolant inlet port and a coolant outlet port (not shown) that communicate with the coolant channel 112*a* of the inner housing 112, and a coolant that has flown in from the coolant inlet port flows through the coolant channel 112*a* and flows out from the coolant outlet port. The stator 120 formed in this way is cooled by the coolant that flows through the coolant channel 112*a* inside the stator housing 110.

On the other hand, the rotor 130 including the hollow rotating shaft 133 is cooled as follows. As shown in FIG. 1, the hollow rotating shaft 133 is provided with a hollow part 133*a* provided over substantially the entire length of the rotor iron core 131; and the hollow part 133*a* is composed of an inner peripheral wall 133*d*, an opening end part 133*b* that makes one end of the inner peripheral wall 133*d* communicate with the outside, and a closure part 133*c* that closes the other end of the inner peripheral wall 133*d*. A coolant is introduced into the hollow part 133*a* of the hollow rotating shaft 133 by coolant introducing means 160. The coolant introducing means 160 comprises a coolant introducing tube 161 whose diameter is smaller than the diameter of the hollow part 133*a* and a flange 162 that is integrated with the coolant introducing tube 161. The coolant introducing tube 161 is inserted into the hollow part 133a, and the flange 162 is fixed to a bracket 157 with a casing 170 on a side of the opening end part 133b of the hollow rotating shaft 133. Further, a coolant supplying tube 163 is connected to the flange 162; and, as shown by the arrows in FIG. 1, a coolant that is supplied from the coolant supplying tube 163 passes through the coolant introducing tube 161, is sent to the closure part 133c at the hollow part 133a, reverses its flow in a gap between the inner peripheral wall 133d of the hollow part 133a and the coolant introducing tube 161, and flows out to the outside of the rotor 130 from a coolant discharge port 162a provided in the flange 162. In this way, the rotor iron core 131 and the rotor conductor 132 are cooled by the coolant that flows through the gap between the inner peripheral wall 133d of the hollow part 133a of the hollow rotating shaft 133 and the coolant introducing tube 161.

Figure 2:
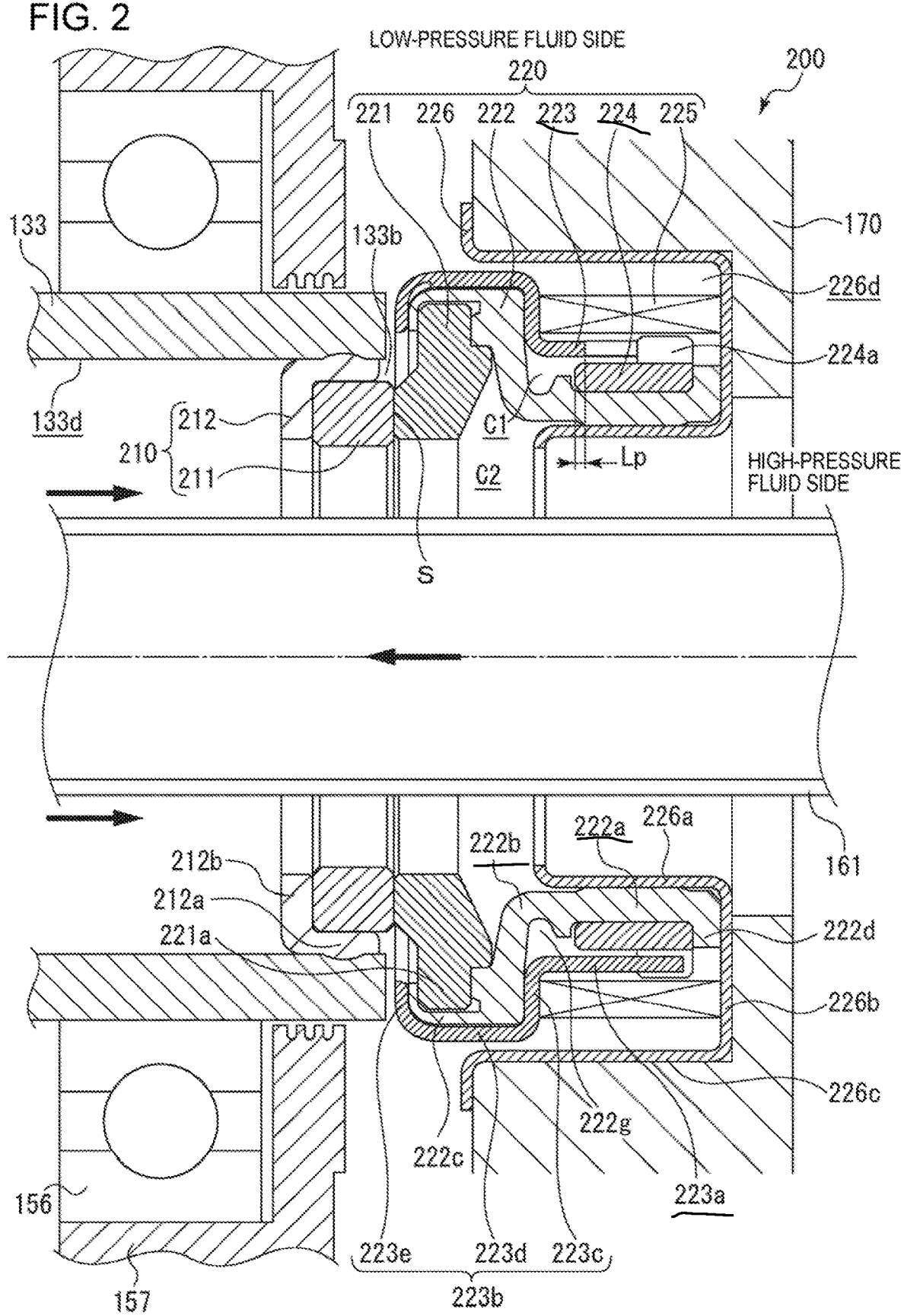
FIG. 2 is a vertical sectional view showing the mechanical seal according to the first embodiment of the present invention.

As shown in FIGS. 1 and 2, the motor 100 is provided with the mechanical seal 200 for sealing the coolant that flows through the hollow part 133a of the hollow rotating shaft 133. The mechanical seal 200 is composed of a rotating-side cartridge 210 that is fixed on the side of the opening end part 133b at the inner peripheral wall 133d of the hollow rotating shaft 133 (rotating shaft according to the present invention) and that rotates together with the hollow rotating shaft 133, and a stationary-side cartridge 220 that is fixed in a non-rotating state to the casing 170. The mechanical seal 200 is an outside-type mechanical seal in which a rotating ring 211 that is disposed at the rotating-side cartridge 210 and a stationary ring 221 that is disposed at the stationary-side cartridge 220 closely contact and slide against each other at sliding faces S, so that a coolant, as a fluid, that flows through the hollow part 133a of the hollow rotating shaft 133 is, as the fluid tries to leak towards an outside-diameter side from an inside-diameter side of the sliding faces S, sealed.

However, when the motor 100 shown in FIG. 1 is used as an on-vehicle motor, the ambient temperature thereof may change in the range of −40° C. to 65° C. When the motor 100 is operated in this temperature range, the temperature of the motor 100 varies in the range of −40° C. to 140° C., and the hollow rotating shaft 133 of the motor 100 may be stretched or contracted on the order of ±1 mm. Ordinarily, if the displacement of the rotating-side cartridge and the stationary-side cartridge in the axial direction is on the order of ±0.1 mm, the entire bellows is deformed to cause the stationary ring to follow the relative displacement of the rotating ring, so that sealing can be performed. However, when the relative displacement between the rotating-side cartridge 210 and the stationary-side cartridge 220 is on the order of ±1 mm, it may not be possible to perform sealing by causing the stationary ring to follow the relative displacement of the rotating ring. Although it is possible to form the entire bellows into a thin-walled bellows so as to allow the bellows to follow the relative displacement on the order of ±1 mm, the thin-walled bellows may be deformed irreversibly into the shape of a barrel due to fluid pressure.

Accordingly, the mechanical seal 200 of the present invention is one that, even if the bellows is greatly deformed due to large changes in the relative position between the rotating ring and the stationary ring and fluid pressure acts upon the bellows in this state, is capable of reliably exhibiting sealing performance by causing the stationary ring to follow the movement of the rotating ring without irreversibly deforming the bellows. The structure of the rotating-side cartridge 210 and the structure of the stationary-side cartridge 220, which constitute the mechanical seal 200 of the present invention, are described below.

The rotating-side cartridge 210 mainly comprises the rotating ring 211 and a cup gasket 212 that seals a portion between the rotating ring 211 and the inner peripheral wall 133d of the hollow rotating shaft 133, and the rotating-side cartridge 210 is press-fitted and fixed to the inner peripheral wall 133d of the hollow rotating shaft 133.

As shown in FIG. 2, the rotating ring 211 is formed from a ring-shaped member that is substantially rectangular in cross section, and is made of, for example, various ceramics, such as silicon carbide or alumina, or cemented carbide having high mechanical strength and excellent wear resistance. A front-surface side of the rotating ring 211 facing the stationary ring 221 is provided with the sliding face S that is mirror-finished by, for example, lapping.

The cup gasket 212 is a ring-shaped member having a substantially L shape in cross section and comprising an outer cylindrical part 212a that is fitted to an outer peripheral surface of the rotating ring 211 and a radial-direction part 212b that covers a back surface of the rotating ring 211, and is formed from an elastic body of, for example, rubber. The sliding face S of the rotating ring 211 is disposed so as to face the stationary ring 221 of the stationary-side cartridge 220. By providing the outer cylindrical part 212a of the cup gasket 212 with a proper tightening margin at a location between the outer peripheral surface of the rotating ring 211 and the inner peripheral wall 133d of the hollow rotating shaft 133, sealing performance is ensured, and the rotating ring 211 is integrally fixed to the hollow rotating shaft 133.

Next, the stationary-side cartridge 220 is described. The stationary-side cartridge 220 mainly comprises a housing 226 (stationary wall according to the present invention) that is fixed in a sealed manner to the casing 170, the stationary ring 221 that is accommodated on a side of a ring-shaped space 226d of the housing 226, a bellows 222 that seals the stationary ring 221, a case member 223 for holding and fixing one end of the bellows 222 with respect to the stationary ring 221, a drive ring 224 (holding member according to the present invention) for holding and fixing the other end of the bellows 222 with respect to the housing 226, and a spring 225 that urges the stationary ring 221 towards the rotating ring 211 via the case member 223. Each structure of the stationary-side cartridge 220 is described below.

As shown in FIG. 2, the housing 226 is a ring-shaped member having a substantially U shape in cross section and mainly comprising an outer ring-shaped part 226c that is press-fitted and fixed to the casing 170, a housing wall 226b that extends inwardly in a radial direction from one end of the outer ring-shaped part 226c, and an inner ring-shaped part 226a that extends in the axial direction from an inside-diameter-side end part of the housing wall 226b. An open part of the housing 226 is press-fitted and fixed to the casing 170 so as to face the sliding face S of the rotating ring 211. Note that although the housing 226 is press-fitted to the casing 170, the housing 226 and the casing 170 may be integrally formed with each other.

As shown in FIG. 2, the stationary ring 221 is formed from a ring-shaped member and is made of a material, such as carbon, having excellent self-lubricity and slidability. The stationary ring 221 is provided with the sliding face S where it slides against the rotating ring 211. The sliding face S of the stationary ring 221 is formed at a ring-shaped part that projects in the axial direction and is mirror-finished into a smooth surface by, for example, lapping. An outer peripheral end part 221a that is covered and sealed by the bellows 222 (described below) is formed at an outer peripheral part of the stationary ring 221. Note that although the materials of the rotating ring 211 and the stationary ring 221 are a combination of silicon carbide (SiC) having excellent wear resistance and carbon having excellent self-lubricity, both of them may be made of, for example, various ceramics, such as silicon carbide or alumina, or cemented carbide.

As shown in FIG. 2, the bellows 222 is a ring-shaped member comprising at least an inner cylindrical part 222a that extends in the axial direction, an outer cylindrical part 222c having a diameter that is larger than that of the inner cylindrical part 222a, and a curved part 222b that connects the inner cylindrical part 222a and the outer cylindrical part 222c and that has a substantially L shape in cross section; and is composed of a nonmetallic elastic body, such as a flexible rubber or a synthetic resin.

A ring-shaped recessed part 222g having an opening part that opens on a low-pressure fluid side and that extends in a peripheral direction is formed on an outer peripheral side of a bent part of the substantially L-shaped curved part 222b. A remaining part, formed by removing the ring-shaped recessed part 222g from the curved part 222b, that is, a thick wall at the ring-shaped recessed part 222g is formed into a recessed part that is substantially semicircular in cross section and whose wall thickness in a radial direction is smaller than the wall thickness in the axial direction.

Even if internal pressure acts upon the bellows 222, the substantially L-shaped curved part 222b is not easily deformed in the direction in which the curved part 222b expands into the shape of a barrel, and the wall thickness of the entire bellows 222 is ensured to prevent the bellows from undergoing expansion deformation into the shape of a barrel. The ring-shaped recessed part 222g formed into a thin-walled recessed part so as to be capable of absorbing the relative displacement between the stationary ring and the rotating ring is easily deformed. That is, when the hollow rotating shaft 133 thermally expands and the bellows 222 contracts, the substantially L-shaped curved part 222b is bent at an acute angle, whereas when the hollow rotating shaft 133 is cooled and contracts, the substantially L-shaped curved part 222b is bent at an obtuse angle, so that the bellows 222 is deformed so as to stretch and contract reversibly in one direction in the axial direction, and the stationary ring follows the movement of the rotating ring to make it possible to reliably exhibit sealing performance.

Figure 3:
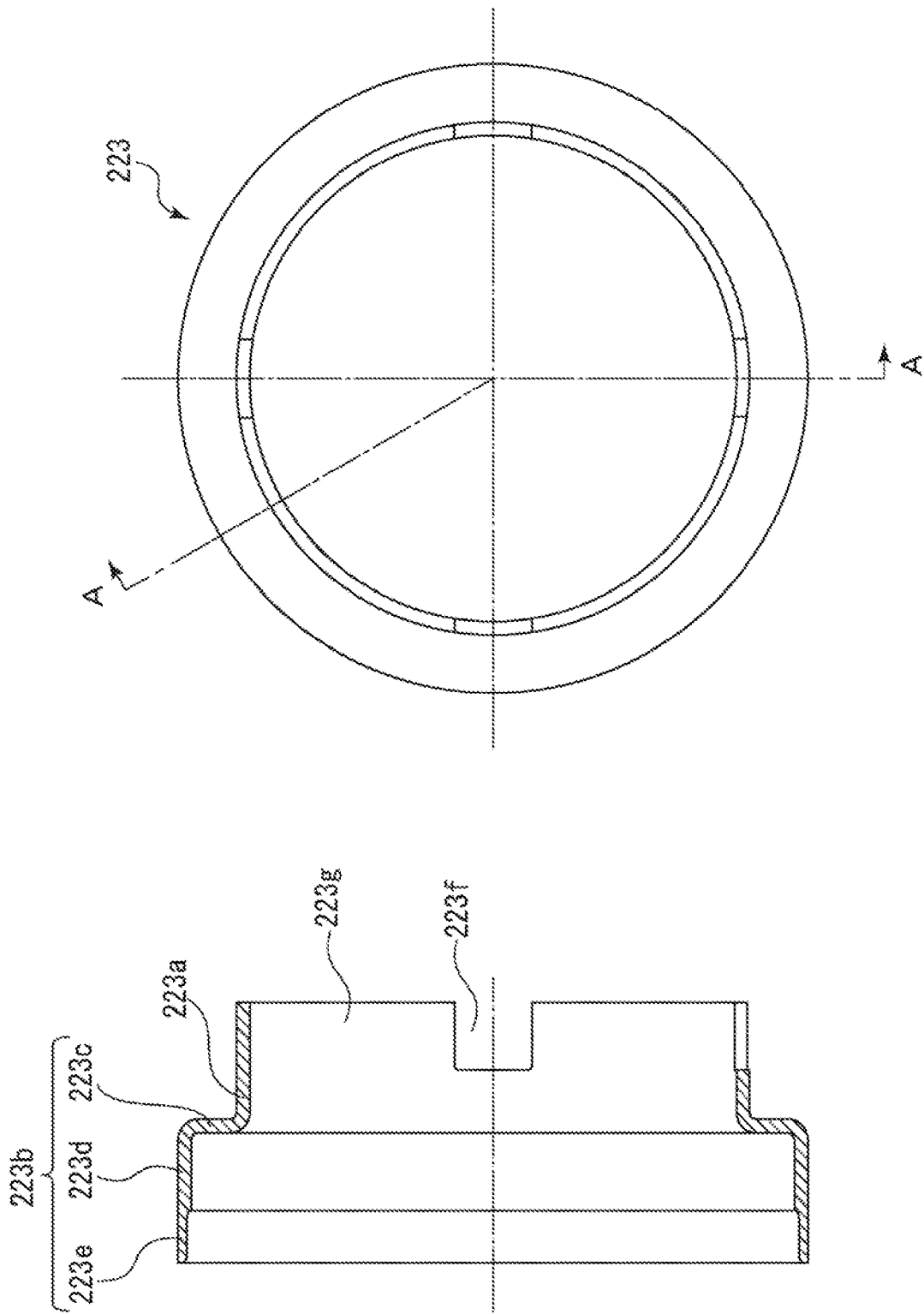
FIG. 3 shows a case member constituting the mechanical seal according to the first embodiment of the present invention.

As shown in FIGS. 2 and 3, the case member 223 comprises an inner cylindrical part 223a (cylindrical wall part of the present invention) and an accommodating part 223b that extend in opposite directions in the axial direction. The inner cylindrical part 223a is composed of a wall part extending in the axial direction and formed over the entire periphery. The accommodating part 223b comprises a case wall 223c that extends outward in the radial direction from one end of the inner cylindrical part 223a and that is formed over the entire periphery, an outer cylindrical part 223d that extends in the axial direction from an outside-diameter-side end part of the case wall 223c and that is formed over the entire periphery, and an outer end part 223e that extends to an end part of the outer cylindrical part 223d and that is formed into a thin-walled part. A wall part 223g, where groove parts 223f that are substantially rectangular notches in the wall part are disposed, is provided at an end part of the inner cylindrical part 223a. In the present embodiment, four groove parts 223f are disposed so as to be equally spaced apart in the peripheral direction of the wall part 223g, and form guiding parts by engaging with four protruding parts 224a disposed at an outer peripheral end part of the drive ring 224 (described later) so as to be equally spaced apart.

Note that the number of groove parts 223f and the number of protruding parts are not limited to 4, and may be, for example, 1, 2, or 3.

The outer peripheral end part 221a of the stationary ring 221 is covered by the outer cylindrical part 222c of the bellows 222, and is accommodated by the accommodating part 223b of the case member 223 from an outside-diameter side thereof. By bending the outer end part 223e of the accommodating part 223b, the outer peripheral end part 221a of the stationary ring 221 is sandwiched and sealed from both sides by the outer cylindrical part 222c, and is integrally fixed to the bellows 222. By this, since the stationary ring 221 and the bellows 222 can be integrally fixed without using an adhesive, it is possible to prevent loosening caused by deterioration of the adhesive. Further, since the outer cylindrical part 222c of the bellows 222 sandwiches and seals the outer peripheral end part 221a of the stationary ring 221 in the axial direction, even if the rotating-side cartridge 210 and the stationary-side cartridge 220 are stretched and contracted to both sides in the axial direction due to temperature changes, the bellows 222 is capable of reliably sealing the outer peripheral end part 221a of the stationary ring 221.

Figure 4:
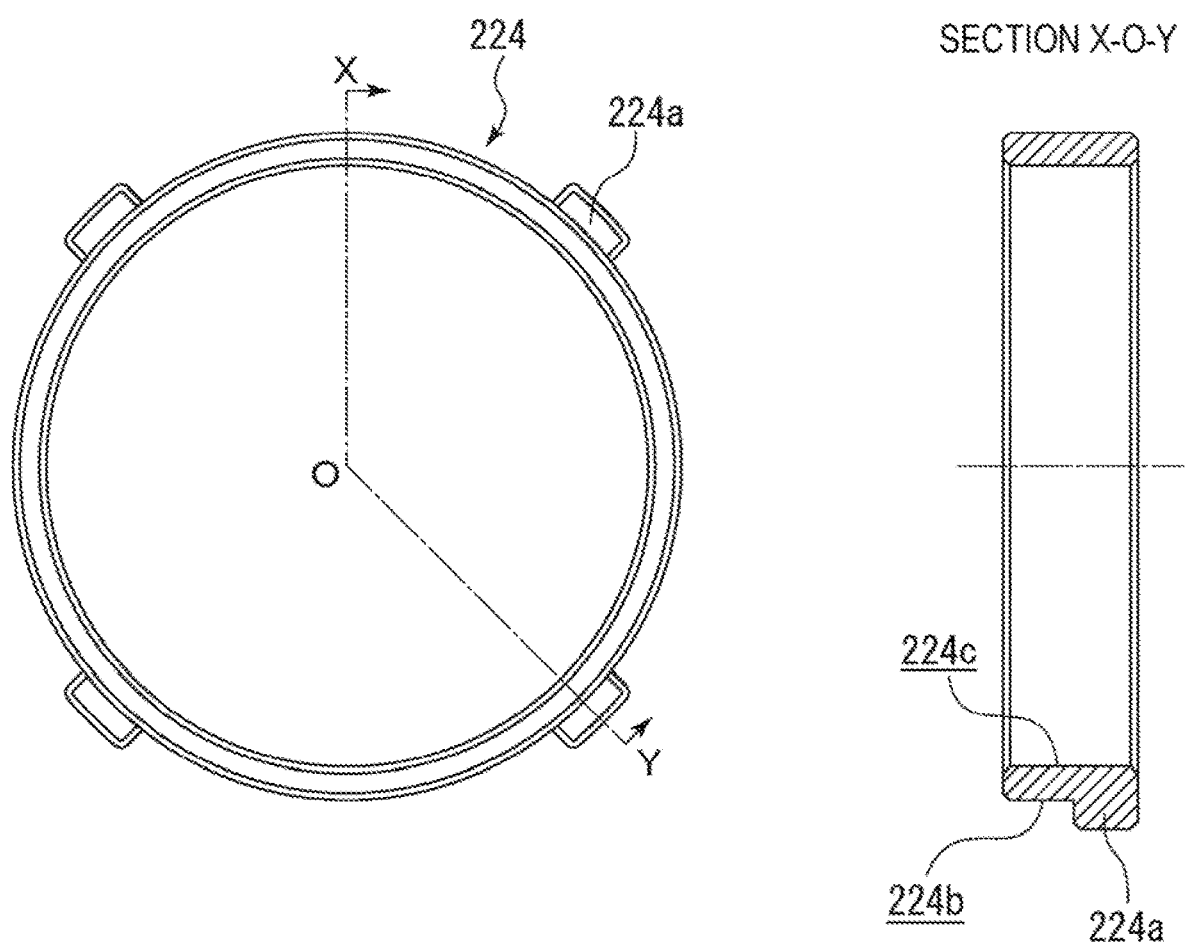
FIG. 4 shows a drive ring constituting the mechanical seal according to the first embodiment of the present invention.

As shown in FIGS. 2 and 4, the drive ring 224 is a ring-shaped member having a substantially rectangular shape in cross section. An inner peripheral part 224c of the drive ring 224 has a cylindrical surface formed with a uniform diameter over the entire length, and is a fitting surface that is fitted to the inner cylindrical part 222a of the bellows 222. An outer peripheral part 224b of the drive ring 224 is also a cylindrical surface formed with a uniform diameter. An axial-direction length of the drive ring 224 is substantially equal to a fitting length of the inner cylindrical part 222a of the bellows 222. The protruding parts 224a that are shorter than the axial-direction length of the drive ring 224 are disposed at an end part of the outer peripheral part 224b so as to be equally spaced apart in the peripheral direction. The outer peripheral part 224b of the drive ring 224 is formed with a diameter that is smaller than the outside diameter of each protruding part 224a and the diameter of the inner cylindrical part 223a of the case member 223. Each protruding part 224a of the drive ring 224 is externally fitted so as to be positioned on a side of an open-end-part side 222d of the inner cylindrical part 222a of the bellows 222, and the inner cylindrical part 222a is provided with a proper tightening margin at a location between the drive ring 224 and the inner ring-shaped part 226a of the housing 226, so that the bellows 222 and the housing 226 are integrally sealed and fixed.

As shown in FIGS. 2 to 4, the inner cylindrical part 223a of the case member 223 described above is capable of covering the entire periphery of the outer side of the curved part 222b of the bellows 222, and each groove part 223f of the case member 223 engages with the protruding part 224a formed on the outer peripheral end part of the drive ring 224 and is formed as a guiding part, so that it is possible to prevent deformation in a twisting direction by allowing the bellows to deform in the axial direction and the radial direction.

Due to the configuration above, in a state in which the hollow rotating shaft 133 thermally expands and the bellows 222 is contracted, the opening part of the ring-shaped recessed part 222g of the substantially L-shaped curved part 222b is bent at an acute angle so as to be closed. Since in the state in which the opening part of the ring-shaped recessed part 222g is closed, the apparent thickness of the curved part of the bellows 222 is increased and the rigidity is increased, the curved part 222*b* is not irreversibly deformed into the shape of a barrel even if fluid pressure acts from the inner side of the bellows 222. The substantially L-shaped curved part 222*b* has a structure that is not easily deformed in the direction in which the substantially L-shaped curved part 222*b* expands into the shape of a barrel even if, in contrast, the hollow rotating shaft 133 contracts and the bellows 222 stretches, the substantially L-shaped curved part 222*b* is deformed at an obtuse angle from a substantial right angle, and fluid pressure acts from the inner side of the bellows 222. Since the entire periphery of the curved part 222*b* of the bellows 222 is covered by the inner cylindrical part 223*a* of the case member 223, it is possible to restrict excess deformation of the bellows 222 and to prevent irreversible deformation in which the bellows 222 expands into the shape of a barrel.

Further, the inner cylindrical part 223*a* of the case member 223 and the outer peripheral part 224*b* of the drive ring 224 include an overlapping portion Lp where they overlap each other over their entire peripheries. Since a radial-direction gap between the case member 223 and the drive ring 224 of the overlapping portion Lp is adjusted to be small, when the bellows 222 is greatly deformed, it is possible to prevent the bellows 222 from protruding from the gap between the inner cylindrical part 223*a* of the case member 223 and the drive ring 224. Further, the overlapping portion Lp makes it possible to restrict a large radial-direction displacement of the case member 223 that holds the outer peripheral end part 221*a* of the stationary ring 221.

Further, as shown in FIG. 2, an outer gap part C1 that absorbs the deformation of the curved part 222*b* is formed on an outside-diameter side (low-pressure fluid side) of the curved part 222*b* of the bellows 222. A ring-shaped inner gap part C2 is formed on an inside-diameter side (high-pressure fluid side) of the curved part 222*b* of the bellows 222 inwardly of the inner cylindrical part 222*a* of the bellows 222. This allows the deformation of the bellows 222 to be absorbed in the outer gap part C1 and in the inner gap part C2, so that the bellows 222 can be deformed without influencing other members and sealing performance can be reliably exhibited by causing the stationary ring to follow the movement of the rotating ring.

Second Embodiment

A mechanical seal 300 according to a second embodiment of the present invention is described with reference to FIG. 5. The mechanical seal 300 according to the second embodiment differs from the mechanical seal 200 of the first embodiment in the structures of a case member 228 and a drive ring 229 (holding member according to the present invention); however, the other basic structures are the same as those of the first embodiment. Corresponding members are given the same reference numerals, and overlapping descriptions are not given.

Figure 5:
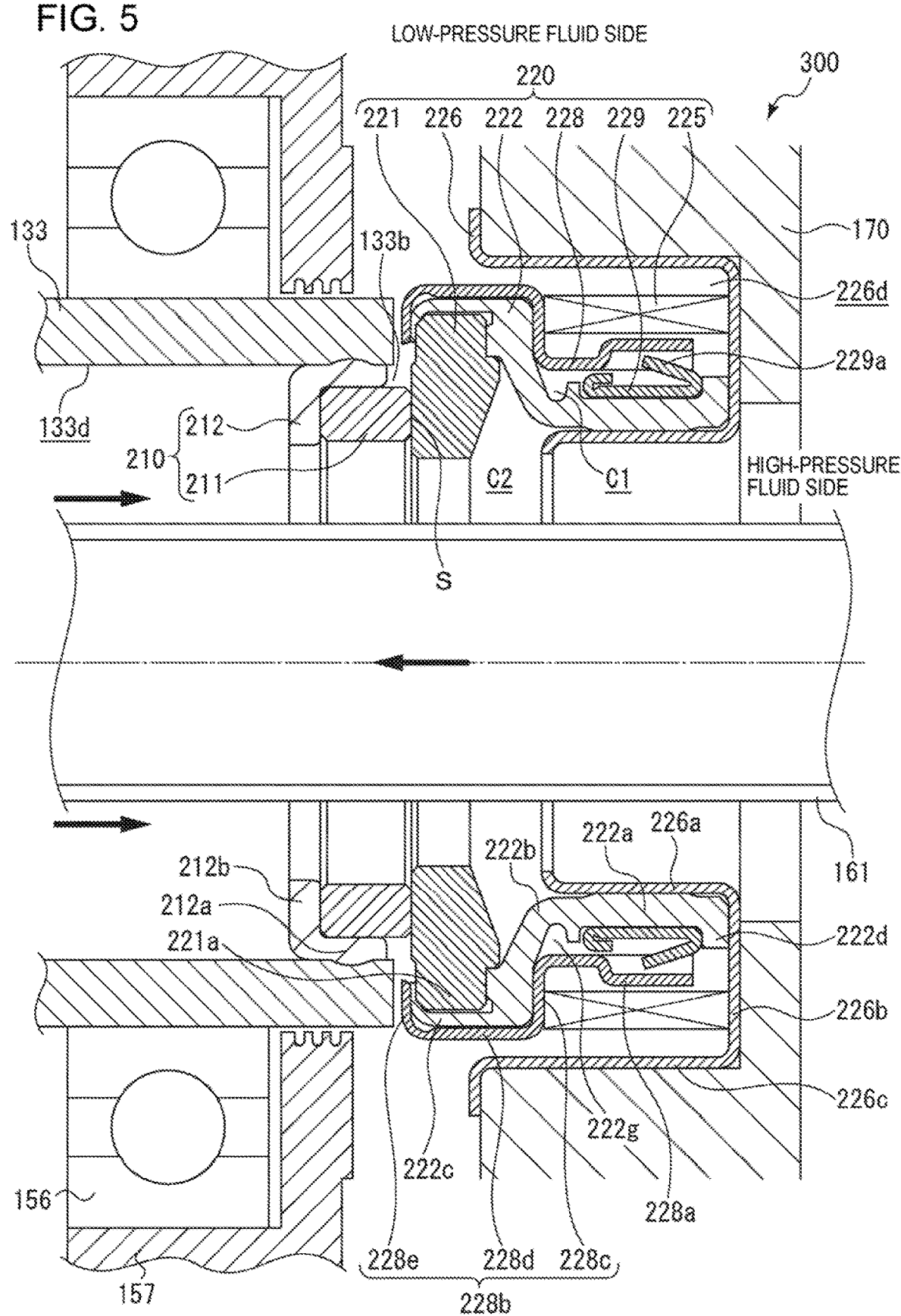
FIG. 5 is a vertical sectional view showing a mechanical seal according to a second embodiment of the present invention.
Figure 6:
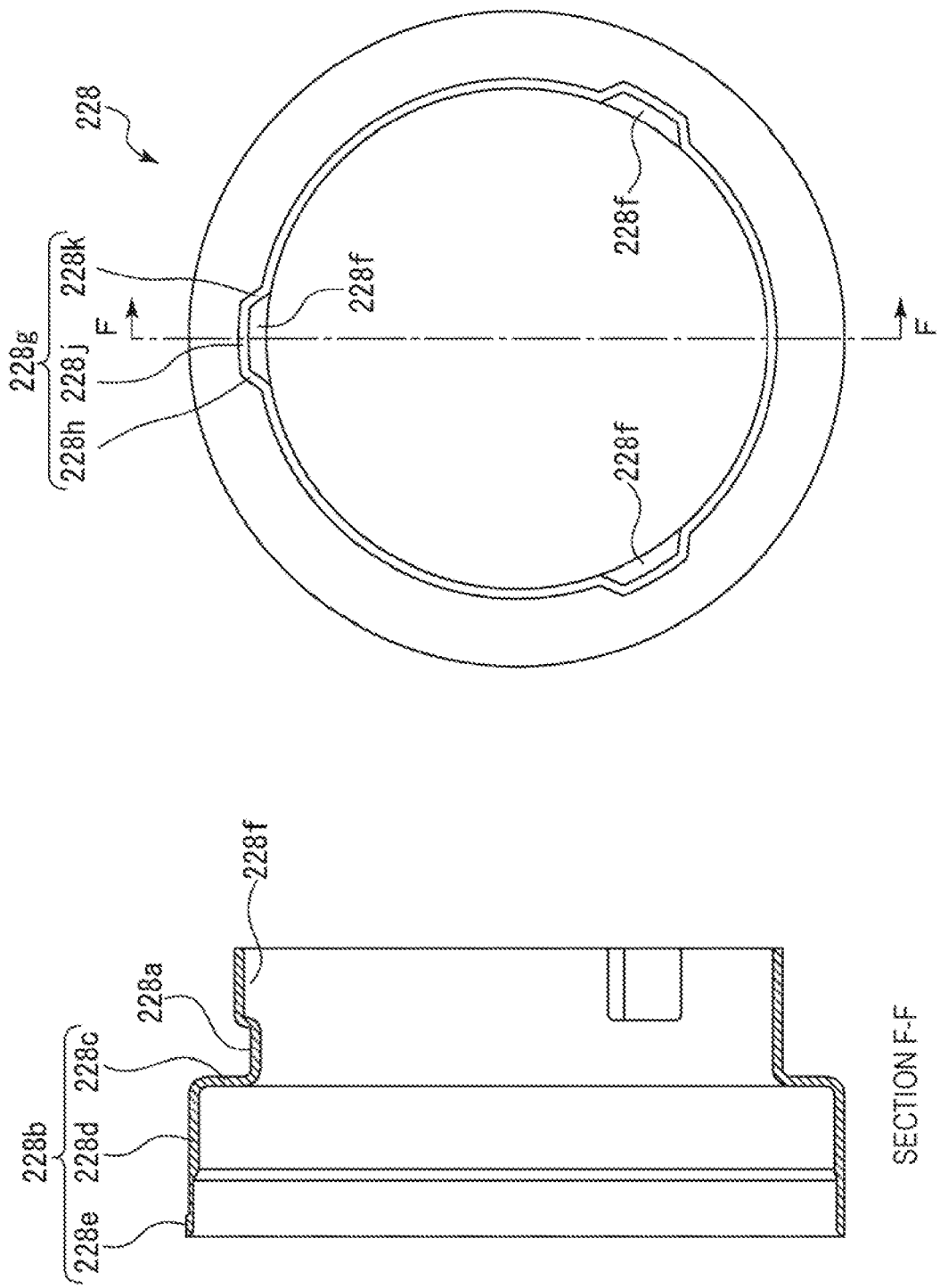
FIG. 6 shows a case member constituting the mechanical seal according to the second embodiment of the present invention.

As shown in FIGS. 5 and 6, the case member 228 is a cylindrical member including a wall part that is continuous in a peripheral direction, and comprises an inner cylindrical part 228*a* (cylindrical wall part of the present invention) and an accommodating part 228*b* that extend in opposite directions in the axial direction. The inner cylindrical part 228*a* is composed of a cylindrical part extending in the axial direction and formed over the entire periphery, and projecting parts 228*g* that project outward in the radial direction are formed on an end part of the cylindrical part. Each projecting part 228*g* is composed of a pair of side walls 228*h* and 228*k* in the peripheral direction and a peripheral wall 228*j* that connects the pair of side walls. Three groove parts 228*f* that are surrounded by the pair of side walls 228*h* and 228*k* and the peripheral wall 228*j* are formed in the peripheral direction. The accommodating part 228*b* comprises a case side wall 228*c* that extends outward in the radial direction from one end of the inner cylindrical part 223*a* and that is continuous in the peripheral direction, an outer cylindrical part 228*d* that extends in the axial direction from an outside-diameter-side end part of the case side wall 228*c* and that is continuous in the peripheral direction, and an outer end part 228*e* that extends at an end part of the outer cylindrical part 228*d* and that is formed into a thin-walled outer end part.

Figure 7:
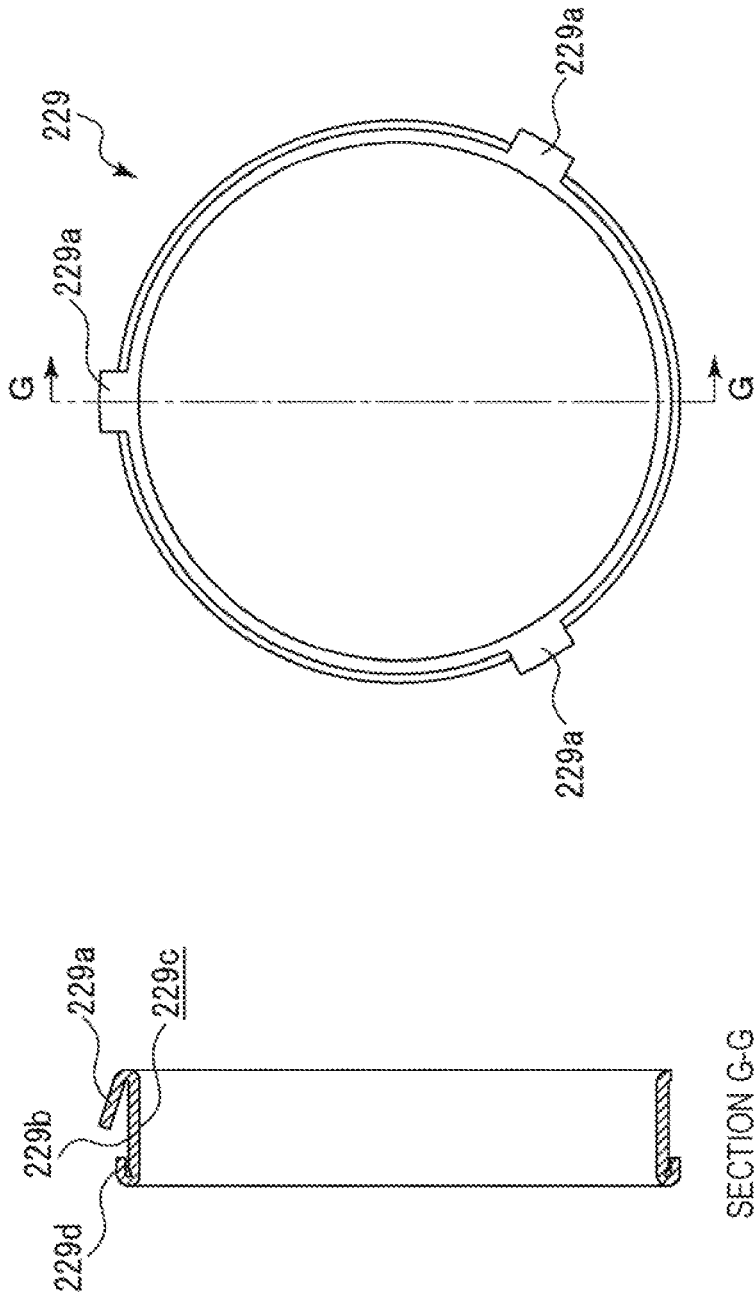
FIG. 7 shows a drive ring constituting the mechanical seal according to the second embodiment of the present invention.

As shown in FIGS. 5 and 7, the drive ring 229 is a member in which a plate-shaped member is molded into a ring shape, and is composed of ring-shaped parts 229*b*, protruding parts 229*a*, and small-diameter parts 229*d*. An inner peripheral part 229*c* at its corresponding ring-shaped part 229*b* is a cylindrical surface formed with a uniform diameter over the entire length, and is a fitting surface that is fitted to an inner cylindrical part 222*a* of a bellows 222. An axial-direction length of the drive ring 229 is substantially equal to a fitting length with respect to the inner cylindrical part 222*a* of the bellows 222. A tongue part having a substantially rectangular shape is disposed on one of end parts of each ring-shaped part 229*b*, and is bent towards an opposite side to (radial-direction outer side of) its corresponding inner peripheral part 229*c* to form its corresponding protruding part 229*a*.

Further, each small-diameter part 229*d* bent outward in the radial direction over substantially the entire periphery is formed on the other end part of its corresponding ring-shaped part 229*b*, and the outside diameter of each small-diameter part 229*d* is smaller than the outside diameter of its corresponding protruding part 229*a*. The outside diameter of each protruding part 229*a* is smaller than the diameter of each peripheral wall 228*j* of the case member 228.

Each protruding part 229*a* of the drive ring 229 is externally fitted so as to be positioned on a side of an open-end-part side 222*d* of the inner cylindrical part 222*a* of the bellows 222, and the inner cylindrical part 222*a* is provided with a proper tightening margin at a location between the drive ring 229 and an inner ring-shaped part 226*a* of a housing 226, so that the bellows 222 and the housing 226 are integrally sealed and fixed. In this way, the drive ring 229 needs to integrally fix the bellows 222 and the housing 226 and is a member that needs to be rigid. However, even if a thin plate is used, each small-diameter part 229*d* formed over substantially the entire periphery makes it possible to provide the thin-plate member with sufficient rigidity, so that manufacturing can be performed at a low cost by using, for example, a press.

As shown in FIG. 5, the groove parts 228*f* of the case member 228 act as guiding parts that guide the movement of the drive ring 229 in the axial direction by engaging with the protruding parts 229*a* (in the present embodiment, three protruding parts) of the drive ring 229. Since the drive ring 229 is accommodated on the inside-diameter side of the case member 228 and an overlapping portion can be formed over the entire periphery, it is possible to prevent protrusion of the bellows in the radial direction and to restrict a large displacement of the case member 228, itself.

Due to the configuration above, in a state in which a hollow rotating shaft 133 thermally expands and the bellows 222 is contracted, the opening part of a ring-shaped recessed part 222*g* of a substantially L-shaped curved part 222*b* is bent at an acute angle so as to be closed. Since in the state in which the opening part of the ring-shaped recessed part 222*g* is closed, the apparent thickness of the curved part of the bellows 222 is increased and the rigidity is increased, the curved part 222b does not irreversibly deform into the shape of a barrel even if fluid pressure acts from the inner side of the bellows 222. The substantially L-shaped curved part 222b has a structure that is not easily deformed in the direction in which the substantially L-shaped curved part 222b expands into the shape of a barrel even if, in contrast, the hollow rotating shaft 133 contracts and the bellows 222 stretches, the substantially L-shaped curved part 222b is deformed at an obtuse angle from a substantial right angle, and fluid pressure acts from the inner side of the bellows 222. Since the case member 228 covers substantially the entire length and the entire periphery of an outer cylindrical part 222c from an inner cylindrical part 222a of the bellows 222, it is possible to restrict excess deformation of the bellows 222 and to prevent irreversible deformation in which the bellows 222 expands into the shape of a barrel.

Third Embodiment

A mechanical seal 400 according to a third embodiment of the present invention is described with reference to FIG. 8. The mechanical seal 400 according to the third embodiment differs from the mechanical seal 200 of the first embodiment and the mechanical seal 300 of the second embodiment in the structures of a case member 238 and a drive ring 239 (holding member according to the present invention); however, the other basic structures are the same as those of the first and second embodiments. Corresponding members are given the same reference numerals, and overlapping descriptions are not given.

Figure 8:
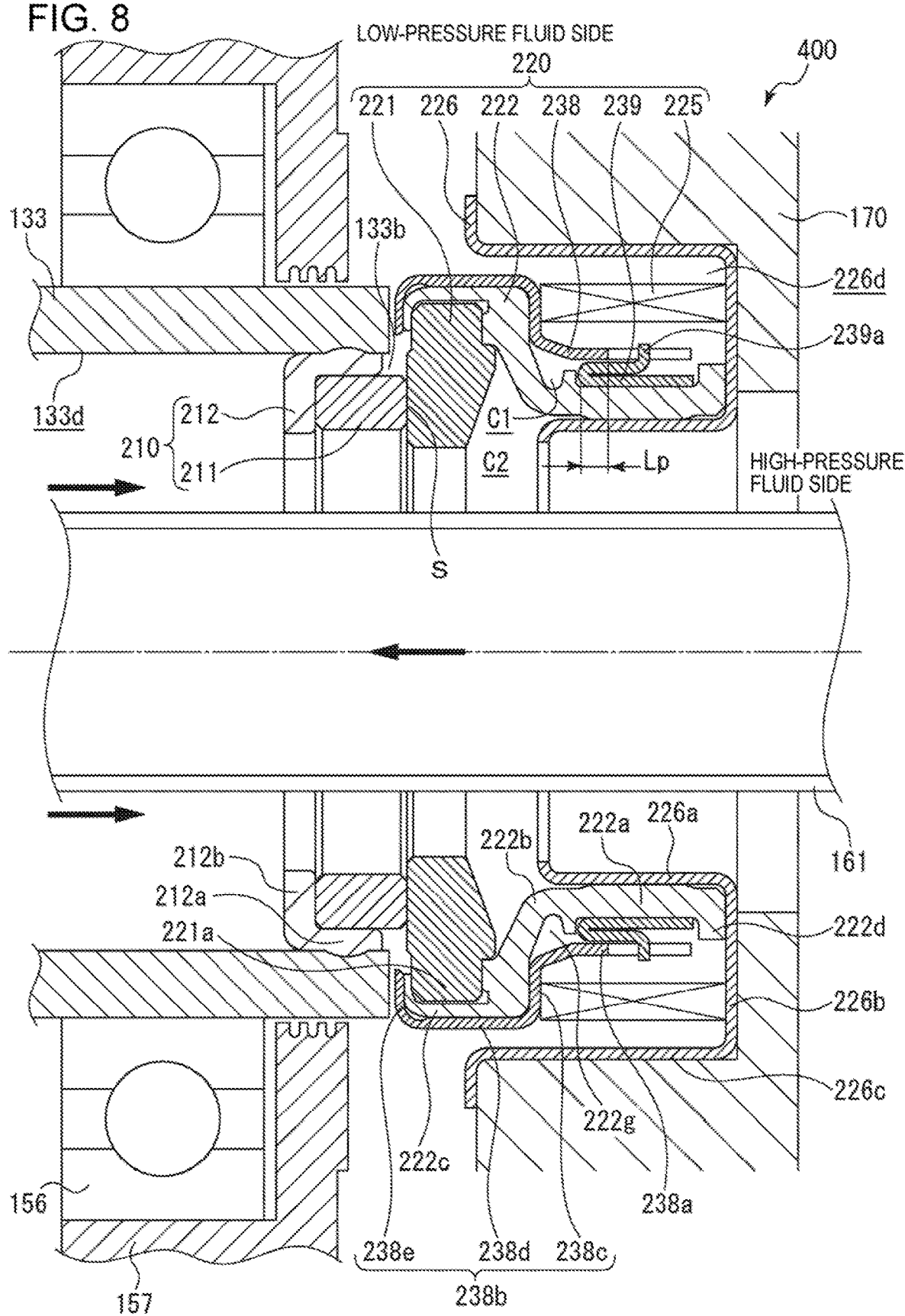
FIG. 8 is a vertical sectional view showing a mechanical seal according to a third embodiment of the present invention.

As shown in FIGS. 8 and 9, the case member 238 comprises a tapered part 238a (cylindrical wall part of the present invention) that tapers in the shape of a cone, a cylindrical accommodating part 238b that is provided on a side of a large-diameter part of the tapered part 238a, and a cylindrical wall part 238g that is provided on a side of a small-diameter part of the tapered part 238a and that extends in the axial direction. The accommodating part 238b comprises a case wall 238c that extends over the entire periphery outward in the radial direction from the side of the large-diameter part of the tapered part 238a, an outer cylindrical part 238d that extends over the entire periphery in the axial direction from an outside-diameter-side end part of the case wall 238c, and an outer end part 238e that extends at an end part of the outer cylindrical part 238d and that is formed into a thin-walled outer end part. Groove parts 238f, which are notches in portions of the cylindrical wall part 238g, are provided on a side of an end part of the cylindrical wall part 238g. In the present embodiment, four groove parts 238f are disposed so as to be equally spaced apart in the peripheral direction, and form guiding parts by engaging with protruding parts 239a of the drive ring 239 (described later). Note that the number of groove parts 238f and the number of protruding parts are not limited to 4, and may be, for example, 1, 2, or 3.

As shown in FIGS. 8 and 10, the drive ring 239 is a member in which a plate-shaped member is molded into a ring shape, and is composed of ring-shaped parts 239b, the protruding parts 239a, and curved parts 239d. Inner peripheral parts 239c at the ring-shaped parts 239b are each a cylindrical surface formed with a uniform diameter over the entire length, and a fitting surface that is fitted to an inner cylindrical part 222a of a bellows 222. An axial-direction length of the drive ring 239 is substantially equal to a fitting length with respect to the inner cylindrical part 222a of the bellows 222. Four curved parts 239d that are each bent so as to closely contact an outer peripheral surface of its corresponding ring-shaped part 239b is provided on one of end parts of its corresponding ring-shaped part 239b so as to be equally spaced apart in the peripheral direction. Further, an end part of each curved part 239d is bent outward in a radial direction to form each protruding part 239a.

As shown in FIG. 8, the drive ring 239 is externally fitted to the inner cylindrical part 222a of the bellows 222, and the drive ring 239 and an inner ring-shaped part 226a of the housing 226 provide the inner cylindrical part 222a of the bellows 222 with a proper tightening margin. This causes the bellows 222 and the housing 226 to be integrally sealed and fixed. In this way, the drive ring 239 needs to integrally fix the bellows 222 and the housing 226, and is, thus, a member that needs to be rigid. However, even if the drive ring 239 of the present embodiment is formed from a thin plate, by integrally forming each curved part 239d, which is bent so as to closely contact an outer peripheral surface of its corresponding ring-shaped part 239b, and each protruding part 239a, formed on an end part of its corresponding curved part 239d, the drive ring 239 exhibits sufficient rigidity. Since the drive ring 239 only needs to have the curved parts 239d formed on only one end part in the axial direction, manufacturing can be performed at a low cost by using, for example, a press.

As shown in FIG. 8, the groove parts 238f of the case member 238 function as guiding parts that guide the movement of the drive ring 239 in the axial direction by engaging with the protruding parts 239a (in the present embodiment, four protruding parts 239a) of the drive ring 239. Since the drive ring 239 is accommodated on the inside-diameter side of the case member 238 and an overlapping portion Lp is formed over the entire periphery, deformation when the bellows 222 has been greatly deformed is restricted, and protrusion of the bellows can be prevented. Since a radial-direction gap at the overlapping portion Lp of the case member 238 and the drive ring 239 is set within a range that allows a rotating ring 211 and a stationary ring 221 to properly closely contact and slide, it is possible to exhibit sealing performance at all times by restricting a large relative displacement between the rotating ring 211 and the stationary ring 221 during driving.

Due to the configuration above, in a state in which a hollow rotating shaft 133 thermally expands and the bellows 222 is contracted, the opening part of a ring-shaped recessed part 222g of a substantially L-shaped curved part 222b is bent at an acute angle so as to be closed. Since in the state in which the opening part of the ring-shaped recessed part 222g is closed, the apparent thickness of the curved part of the bellows 222 is increased and the rigidity is increased, the curved part 222b is not irreversibly deformed into the shape of a barrel even if fluid pressure acts from the inner side of the bellows 222. The substantially L-shaped curved part 222b has a structure that is not easily deformed in the direction in which the substantially L-shaped curved part 222b expands into the shape of a barrel even if fluid pressure acts from the inner side of the bellows 222 in a state in which, in contrast, the hollow rotating shaft 133 contracts and the bellows 222 stretches, and the substantially L-shaped curved part 222b is deformed at an obtuse angle from a substantial right angle. Since the case member 238 covers substantially the entire length and the entire periphery of an outer cylindrical part 222c from the inner cylindrical part 222a of the bellows 222, it is possible to restrict excess deformation of the bellows 222 and to prevent irreversible deformation in which the bellows 222 expands into the shape of a barrel.

As described above, in the mechanical seals 200, 300, and 400 of the present invention, even if the relative position between the rotating ring 211 mounted on the hollow rotating shaft 133 and the stationary ring 221 mounted on the casing varies greatly due to temperature changes, the bellows 222 is capable of absorbing relative displacement by deforming greatly in one direction in the axial direction. Even if fluid pressure acts in a state in which the bellows 222 is greatly deformed due to the relative displacement, the bellows is prevented from being irreversibly deformed, so that it is possible to reliably exhibit sealing performance by causing the stationary ring to follow the movement of the rotating ring without influencing other members.

Although the mechanical seals 200, 300, and 400 in the embodiments above are described as being applied to the motor 100 including a hollow rotating shaft, as long as a hollow rotating shaft is included, a generator or a generator motor may be used. Although, in the embodiments above, the rotor 130 is a rotor including a conductor, the rotor 130 may be a permanent magnet rotor.

In the embodiments above, although the inner cylindrical parts 223a, 228a, 238a, which correspond to cylindrical wall parts of the present invention, are each formed as an integrally formed cylindrical wall part, they may each be formed as a cylindrical wall part made by combining members separated in the peripheral direction. Here, the cylindrical wall part may be one in which the members separated in the peripheral direction are joined to each other, or one in which individual members are combined without joining them.

REFERENCE SIGNS LIST 100 motor
110 stator housing
120 stator
130 rotor
133 hollow rotating shaft
133a hollow part
133b opening end part
133d inner peripheral wall
151, 155 bearing part
160 coolant introducing means
170 casing
200, 300, 400 mechanical seal
210 rotating-side cartridge
211 rotating ring
212 cap gasket
220 stationary-side cartridge
221 stationary ring
222 bellows
222a inner cylindrical part
222b curved part
222c outer cylindrical part
222d open end part
223, 228, 238 case member
223a, 228a, 238a inner cylindrical part (cylindrical wall part)
223f, 228f groove part
224, 229, 239 drive ring (holding member)
224a, 229a, 239a protruding part
224b outer peripheral part
225 spring
226 housing (stationary wall)
229b ring-shaped part
S sliding face
C1 outer gap part
C2 inner gap part
Lp overlapping portion

The invention claimed is:

1. A mechanical seal that seals a fluid from leakage to an outside-diameter side from an inside-diameter side of sliding faces, comprising:
a stationary ring and a rotating ring which slide against each other at the sliding faces to seal the fluid flowing through the inside-diameter side of the stationary ring and the rotating ring from leakage to the outside-diameter side;
a bellows interposed between the stationary ring and a stationary wall wherein the stationary ring is fixed to the stationary wall with the bellows, wherein the stationary wall is comprised of an outer ring-shaped part, a housing wall that extends inwardly in a radial direction from one end of the outer ring-shaped part, and an inner ring-shaped part that extends in an axial direction from an inside-diameter-side end part of the housing wall;
a case member for holding an outer cylindrical part of the bellows at the stationary ring; and
a holding member that is fitted to an inner cylindrical part of the bellows and that has an axial-direction length that is substantially equal to a fitting length with respect to the inner cylindrical part,
wherein:
the bellows has a curved part between the outer cylindrical part and the inner cylindrical part, and the inner cylindrical part has a thick wall part which extends in the radial direction, and a ring-shaped recessed part is formed between the curved part and the thick wall part, having an opening that opens on the outside-diameter side and that extends in a peripheral direction,
the case member is provided with a cylindrical wall part that covers a radial-direction outer side of the curved part over an entire periphery of the cylindrical wall part,
the holding member is a member in which a plate-shaped member is molded into a ring shape, and is composed of ring-shaped parts, curved parts are folded over sections on the ring-shaped parts at a first end, and an end part of each curved part is bent from an end part of the folded over section in a radially outward direction to form a protruding part at an open-end side of the bellows opposite to a side connected to the stationary ring, which protruding part is shorter than the axial-direction length of the holding member,
the case member has a groove part engaged with the protruding part,
an outer gap part is formed between the curved part of the bellows and the case member, allowing stretchable deformation of the bellows without restraining the bellows,
the inner ring-shaped part of the stationary wall is fitted to the inner cylindrical part of the bellows without being fitted to the curved part of the bellows nor the stationary ring, wherein an inner gap part is formed on an inside-diameter side of the bellows, allowing stretchable deformation of the bellows without restraining the bellows, in a manner allowing the bellows and the stationary ring to move in the axial direction and the radial direction,
the inner gap part communicates with the inside-diameter side, and
the cylindrical wall part of the case member and the holding member overlap by an overlapping portion over the entire periphery of the outer cylindrical wall part and thereby cover the curved part and the outer gap part of the bellows over the entire periphery of the cylindrical wall part.

2. A mechanical seal that seals a fluid from leakage to an outside-diameter side from an inside-diameter side of sliding faces, comprising:

- a stationary ring and a rotating ring which slide against each other at the sliding faces to seal the fluid flowing through the inside-diameter side of the stationary ring and the rotating ring from leakage to the outside-diameter side;
- a bellows interposed between the stationary ring and a stationary wall wherein the stationary ring is fixed to the stationary wall with the bellows, wherein the stationary wall is comprised of an outer ring-shaped part, a housing wall that extends inwardly in a radial direction from one end of the outer ring-shaped part, and an inner ring-shaped part that extends in an axial direction from an inside-diameter-side end part of the housing wall;
- a case member for holding an outer cylindrical part of the bellows at the stationary ring; and
- a holding member that is fitted to an inner cylindrical part of the bellows and that has an axial-direction length that is substantially equal to a fitting length with respect to the inner cylindrical part, wherein:

the bellows has a curved part between the outer cylindrical part and the inner cylindrical part, and the inner cylindrical part has a thick wall part which extends in the radial direction, and a ring-shaped recessed part is formed between the curved part and the thick wall part, having an opening that opens on the outside-diameter side and that extends in a peripheral direction, the case member is provided with a cylindrical wall part that covers a radial-direction outer side of the curved part over an entire periphery of the cylindrical wall part, the holding member is a member in which a plate-shaped member is molded into a ring shape, and is composed of ring-shaped parts, curved parts are formed by first folded over sections on the ring-shaped parts at a first end, and a protruding part formed by a second folded over section at a second end opposite the first end, the outer diameter of the second folded over section is larger than the outer diameter of the first folded over section, the protruding part at an open-end side of the bellows opposite to a side connected to the stationary ring, which protruding part is shorter than the axial-direction length of the holding member, the case member has a groove part engaged with the protruding part, an outer gap part is formed between the curved part of the bellows and the case member, allowing stretchable deformation of the bellows without restraining the bellows, the inner ring-shaped part of the stationary wall is fitted to the inner cylindrical part of the bellows without being fitted to the curved part of the bellows nor the stationary ring, wherein an inner gap part is formed on an inside-diameter side of the bellows, allowing stretchable deformation of the bellows without restraining the bellows, in a manner allowing the bellows and the stationary ring to move in the axial direction and the radial direction, the inner gap part communicates with the inside-diameter side, and the cylindrical wall part of the case member and the holding member overlap by an overlapping portion over the entire periphery of the outer cylindrical wall part and thereby cover the curved part and the outer gap part of the bellows over the entire periphery of the cylindrical wall part.

* * * * *